United States Patent
Son

(12) 
(10) Patent No.: US 6,421,332 B1
(45) Date of Patent: Jul. 16, 2002

(54) APPARATUS FOR MEASURING INPUT AND OUTPUT LEVELS OF BASE STATION TRANSMITTERS IN A MOBILE COMMUNICATION SYSTEM

(75) Inventor: O Sung Son, Kyoungki-do (KR)

(73) Assignee: Hyundai Electronics Ind. Co., Ltd., Kyoungki-do (KR)

( * ) Notice: Subject to any disclaimer, the term of this patent is extended or adjusted under 35 U.S.C. 154(b) by 0 days.

(21) Appl. No.: 09/309,795

(22) Filed: May 11, 1999

(30) Foreign Application Priority Data

Jun. 16, 1998 (KR) .............................. 98-22547

(51) Int. Cl.[7] .............................................. H04B 7/216
(52) U.S. Cl. ........................ 370/335; 370/242; 370/246; 455/67.1; 455/115; 455/126; 455/424
(58) Field of Search .................................. 370/242, 243, 370/246, 247, 249, 335; 375/213, 224; 455/115, 126, 127, 67.1, 423, 424, 560

(56) References Cited

U.S. PATENT DOCUMENTS 5,125,100 A * 6/1992 Katznelson ................ 455/126
5,485,486 A   1/1996 Gilhousen et al.
5,842,113 A   11/1998 Nanda et al.
6,275,685 B1 * 8/2001 Wessel et al. ............... 455/126

* cited by examiner

Primary Examiner—Lee Nguyen
(74) Attorney, Agent, or Firm—Lackenbach Siegel; J. Harold Nissen

(57) ABSTRACT

The present invention relates to an apparatus for measuring input and output levels of base station transmitters in the mobile communication system, for allowing measurement of an input/output level of a transmitting stage so as to check an operation state of a digital block through detection of an intermediate frequency (IF) output level of the transmitting stage and an operation state of a transmitter by the frequency allocation (FA) through measurement of an output level of the transmitter. The present invention has splitters on paths to split transmitting intermediate frequency (IF). A split signal over one path is regularly coupled to the system and a split signal over another path is sent to a power detector to measure power. A phase locked loop (PLL) local signal is generated and transmitting RF signals up-converted by the FA are converted into specified IF signals to measure power. The two measured power values are compared to determine a state of the transmitter. If there is only input without output, change of a switching condition of the transmitter is automatically performed, thus realizing a dual system.

6 Claims, 2 Drawing Sheets

ABSTRACT

APPARATUS FOR MEASURING INPUT AND OUTPUT LEVELS OF BASE STATION TRANSMITTERS IN A MOBILE COMMUNICATION SYSTEM

BACKGROUND OF THE INVENTION

1. Field of the Invention

The present invention relates to measurement of input and output levels of base station transmitters in a mobile communication system and more particularly to an apparatus for measuring input and output levels of base station transmitters in the mobile communication system, for allowing measurement of an input/output level of a transmitting stage so as to check an operation state of a digital block through detection of an intermediate frequency (IF) output level of the transmitting stage and an operation state of a transmitter by the frequency allocation (FA) through measurement of an output level of the transmitter.

2. Description of Related Art

Generally, a mobile communication system such as a CDMA mobile communication system or a digital cellular system performs forward (from base station to mobile station) power control and reverse (from mobile station to base station) power control.

Particularly, the CDMA mobile communication system uses the forward and reverse power control to obtain advantages such as large traffic carrying capacity and calls of good quality.

Mobile station transmission power is controlled to ensure that a base station receiver receives transmission signals of all mobile stations within a service area at a nominal strength.

Mobile station transmission signals are designed to be received with the same strength regardless of the mobile station's location and propagation loss. When the transmission power of all the mobile stations within the service area is controlled in such manner, total received power of the base station receiver can be calculated in such a manner of multiplying the nominal received power by the number of mobile stations.

It is very important to measure the state of a base station transmitter in optimally controlling the base station transmission power. This is because the transmission power cannot be properly controlled without knowing the base station transmission power.

Figure 1:
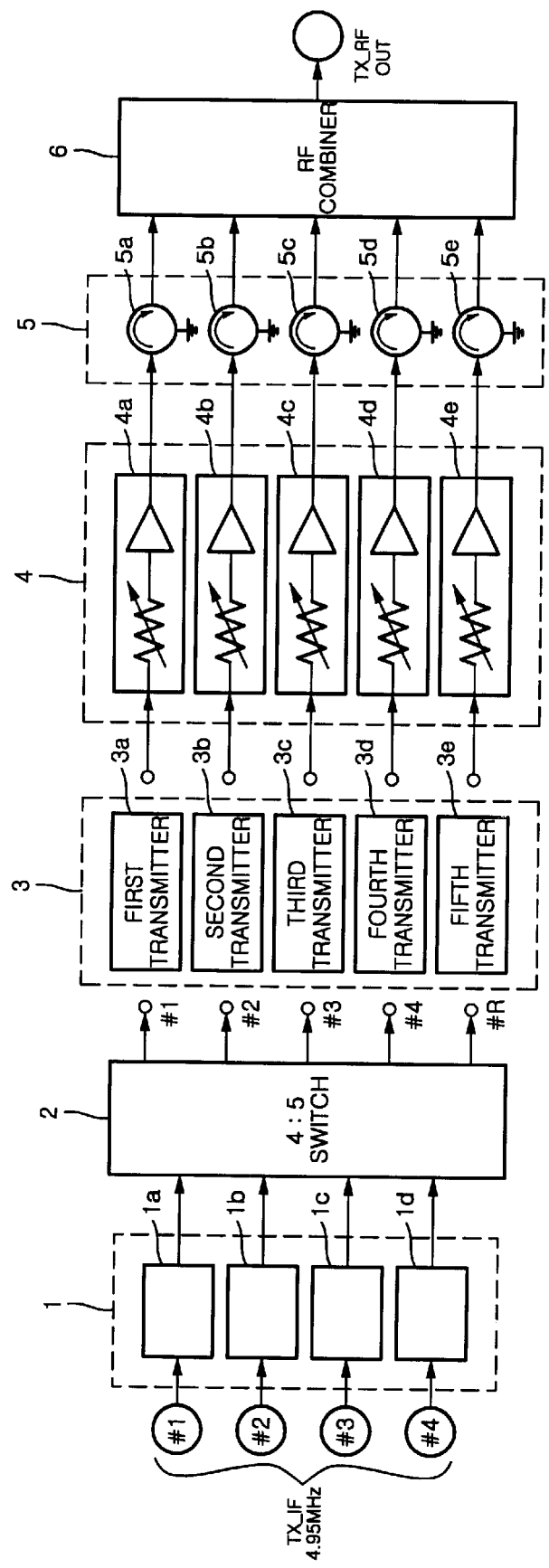

FIG. 1 shows a configuration of an embodiment of a distribution & combine shelf unit (DICSU that is a component making up the transmitting stage) within the base station of the conventional mobile communication system when 4FAs are applied.

Attenuation block 1 includes first to fourth attenuators 1a~1d for attenuating four transmission IF signals, $TX\_IF$, of 4.95MHz as much as desired. 4:5 switch 2 switches the IF signals output from the first to fourth attenuators 1a~1d in the attenuation block 1. Transmitter block 3 up-converts the IF signals received from the 4:5 switch 2 to provide radio frequency (RF) signals.

Attenuation and amplification block 4 includes first to fifth attenuator-amplifiers 4a~4e for attenuating and amplifying the RF signals received from respective transmitters in the transmitter block 3 down to a predetermined level and up to a predetermined level to provide outputs. Isolator block 5 includes first to fifth isolators 5a~5e for preventing transmission errors caused by reflected waves of the RF signals output from the attenuator-amplifiers in the attenuation and amplification block 4. RF combiner 6 combines the RF signals from the respective isolators 5a~5e in the isolator block 5 to forward a single transmitting RF signal.

Once four transmitting IF signals, $TX\_IF$, of 4.95MHz modulated in the CDMA mode are input into such DICSU within the conventional mobile communication base station, the first to fourth attenuators 1a~1d in the attenuation block 1 respectively attenuate the four IF signals down to 5 dB before sending them to the 4:5 switch 2.

The 4:5 switch 2 switches the input signals to the transmitter block 3 including four transmitters 3a~3d respectively coupled to 4FAs and one spare transmitter 3e.

The 4:5 switch 2 just couples the four input IF signals to the corresponding first to fourth transmitters 3a~3d when the first to fourth transmitters 3a~3d in the following transmitter block 3 operate in normal. In this case, the fifth transmitter 3e does not have an input signal. When a certain transmitter among the first to fourth transmitters 3a~3d is in an abnormal state, the 4:5 switch cuts off the first erroneous transmitter and switches the IF signal that is expected to be input into the erroneous transmitter to the fifth transmitter 3e.

The first to fifth transmitters 3a~3e in the transmitter block 3 up-convert the input IF signals into RF signals before sending them to the attenuation and amplification block 4.

The first to fifth attenuator-amplifiers 4a~4e in the attenuation and amplification block 4 attenuate the input RF signals and amplify the attenuated RF signals up to a predetermined level before sending them to the isolator block 5.

The first to fifth isolators 5a~5e in the isolator block 5 compensate signals output from the first to fifth attenuator-amplifiers 4a~4e and provide the compensated RF signals to the RF combiner 6. The RF combiner 6 combines the RF signals input through different paths to output a transmitting signal via one output port.

However, in the conventional base station DICSU, input signals are just transmitted to the transmitter and combined at the combiner to provide an output. The conventional DICSU does not have a function of checking errors that may occur in transmission paths.

In the conventional art, an operator should manually search for erroneous parts with test equipment when some errors occur in the transmission paths. This is very inconvenient.

Moreover, it takes too much time to find out erroneous parts.

Since the error check function is not provided, the operator cannot be informed of output levels of transmitters and levels of the CDMA modulated input signals.

When the gain of a transmitter drops, a present switching condition of the transmitter should be changed. However, the conventional switch changes the switching state only when failing in setting channels due to failure in transmitter's PLL locking. The conventional switch without a function of detecting the gain of a transmitter cannot change the present switching condition with respect to the transmitter having the dropped gain.

SUMMARY OF THE INVENTION

Accordingly, the present invention is directed to an apparatus for measuring input and output levels of base station transmitters in the mobile communication system that substantially obviates one or more of the limitations and disadvantages of the related art.

An objective of the present invention is to provide an apparatus for measuring input and output levels of base station transmitters in the mobile communication system, for allowing measurement of an input/output level of a transmitting stage so as to check an operation state of a digital block through detection of an intermediate frequency (IF) output level of the transmitting stage and an operation state of a transmitter by the frequency allocation (FA) through measurement of an output level of the transmitter.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, in a base station signal distribution & combine shelf unit (DICSU) including a switch for switching IF to be transmitted via transmitters to a plurality of transmitters, a plurality of amplifiers for amplifying a plurality of transmitter output signals, and a radio frequency (RF) combiner for receiving a plurality of amplifier output signals via a plurality of isolators and combining a plurality of RF signals to forward a combined signal through a single path, an apparatus comprises: a frequency splitting block disposed prior to the switch, for splitting the IF to be transmitted via the transmitters; a frequency selection block for selecting and outputting one of a plurality of signals output from the frequency splitting block according to a transmitter selection signal output from a central processing unit that controls overall system operation; an amplification and filtering block for amplifying an output signal from the frequency selection block up to a predetermined level and filtering an amplified signal to provide a signal of a set band; a coupler for providing a signal corresponding to the signal output from the RF combiner as a transmitter output level signal; a phase locked loop block for generating oscillation frequency of a predetermined band according to control of the central processing unit; a frequency mix and filtering block for amplifying the signal output from the coupler up to a predetermined level, mixing the amplified signal with the signal output from the phase locked loop block, and band filtering a mixed signal to provide an output; an output level detection block for detecting a level of the signal output from the frequency mix and filtering block; the central processing unit for applying the selection signal for a transmitter to be measured to the frequency selection block so as to select the transmitter, storing the signals respectively output from the amplification and filtering block and the frequency mix and filtering block in an internal memory as input and output levels of the selected transmitter, and providing the transmitter input and output level values stored in the internal memory to an RF control card assembly; and the RF control card assembly for controlling switch of the transmitter based upon the transmitter input and output level values received from the central processing unit.

The frequency selection block consists of a multiplexer that selects one of the plurality of signals output from the frequency splitting block according to the transmitter selection signal output from the central processing unit for controlling the overall system operation.

The amplification and filtering block comprises: an amplifier for amplifying the signal output from the frequency selection block; an attenuator for attenuating a signal output from the amplifier; and a band filter for filtering an output signal from the attenuator to provide a signal having the set band.

The frequency mix and filtering block comprises: an amplifier for amplifying the signal output from the coupler up to the predetermined level; an attenuator for attenuating an output signal from the amplifier down to a predetermined level; a frequency mixer for mixing output frequency from the attenuator with the oscillation frequency output from the phase locked loop block; and a band filter for filtering output frequency from the frequency mixer to obtain the signal of the set band.

The apparatus for measuring input and output levels of base station transmitters according to the present invention further comprises: a first voltage amplification block for operational-amplifying the output signal from the amplification and filtering block and providing an amplified signal to the central processing unit; and a second voltage amplification block for operational-amplifying the output signal from the output level detection block and providing an amplified signal to the central processing unit.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

Figure 2:
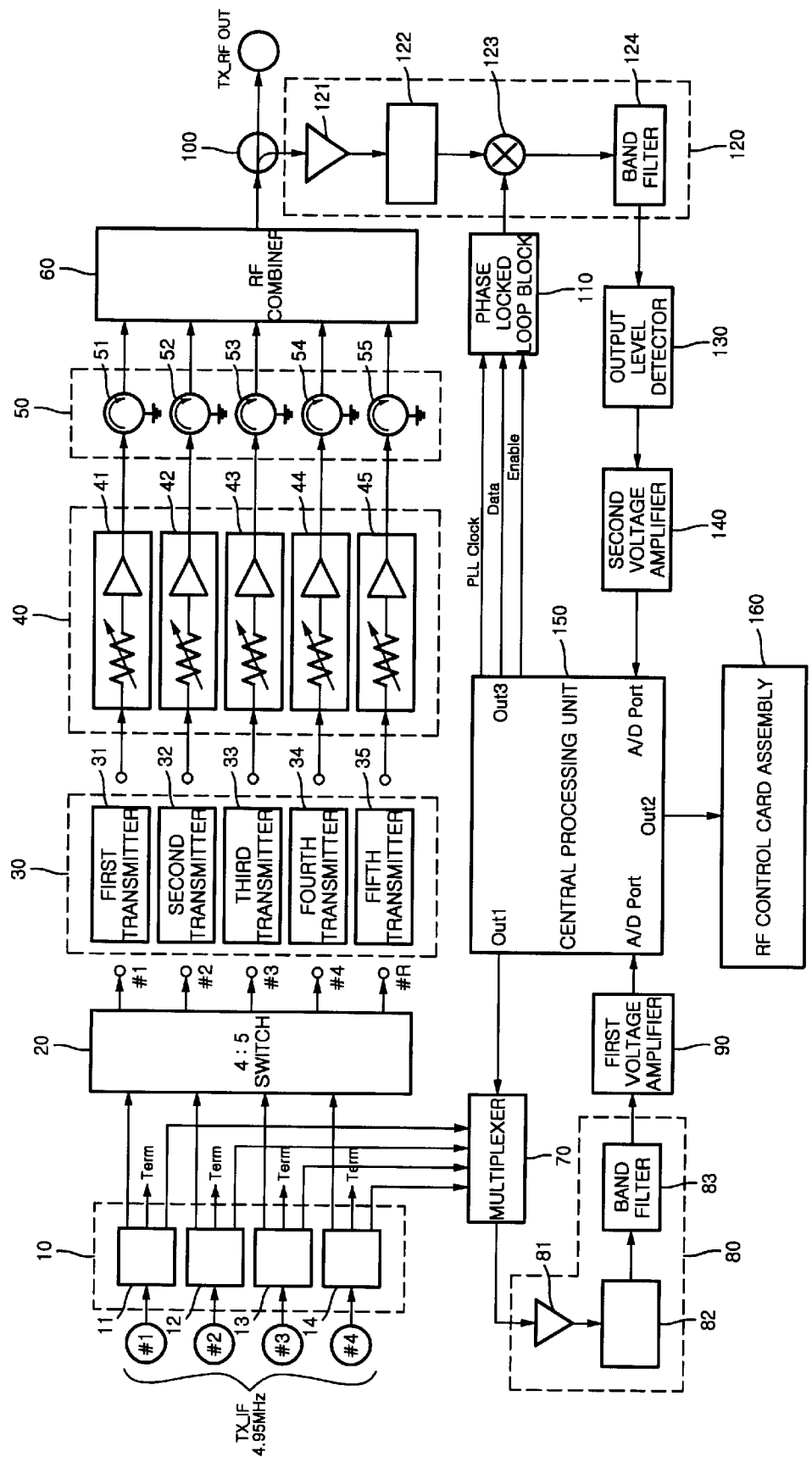

In the drawings:

FIG. 1 shows a configuration of a base station transmitting stage system in a conventional mobile communication system; and FIG. 2 shows a configuration of an apparatus for measuring input and output levels of base station transmitters in a mobile communication system according to the present invention.

DETAILED DESCRIPTION OF PREFERRED EMBODIMENT

Reference will now be made in detail to the preferred embodiments of the present invention, examples of which are illustrated in the accompanying drawings.

The preferred embodiment of the present invention according to such above technical idea will now be described in detail with reference to the accompanying drawings.

As shown in FIG. 2, the present invention comprises: 4:5 switch 20 for switching IF signals respectively output from first to fourth frequency splitters 11~14 in frequency splitting block 10; transmitter block 30 having first to fifth transmitters 31~35 for up-converting the IF signals from the 4:5 switch 20 to RF signals; attenuation and amplification block 40 having first to fifth attenuator-amplifiers 41~45 for amplifying the RF signals from the transmitters in the transmitter block 30 up to a predetermined level; isolator block 50 having first to fifth isolators 51~55 for processing the RF signals output from the attenuator-amplifiers in the attenuation and amplification block 40 to prevent transmission errors by reflected waves; and RF combiner 60 for combining RF signals output from the isolators in the isolator block 50 to output a single transmitting RF signal. These components are same as those of the conventional DICSU.

The present invention further comprises: frequency splitting block 10 having first to fourth frequency splitters 11~14 for splitting four transmitting IF signals, TX_IF, of 4.95 MHz; multiplexer 70 for selecting and outputting one of multiple signals from the frequency splitting block 10 according to a transmitter selection signal received from central processing unit 150 for controlling overall system operation; amplification and filtering block 80 for amplifying the output signal from the multiplexer 70 up to a predetermined level and filtering the amplified signal to provide a signal of a predetermined band; first voltage amplifier 90 for operational-amplifying the output signal from the amplification and filtering block 80 before transmitting it to the central processing unit 150; coupler 100 for providing a signal corresponding to the output signal from the RF combiner 60 as a transmitter output level signal; phase locked loop block 110 for generating oscillation frequency of a certain band according to the control of the central processing unit 150; frequency mix and filtering block 120 for amplifying the output signal from the coupler 100 up to a predetermined level, mixing the amplified signal with the output signal from the phase locked loop block 110, and band-filtering the mixed signal to provide an output; output level detector 130 for detecting a level of the output signal from the frequency mix and filtering block 120; second voltage amplifier 140 for operational-amplifying the output signal from the output level detector 130 before sending it to the central processing unit 150; central processing unit 150 for providing the selection signal for a transmitter to be measured to the multiplexer 70 to select the transmitter, storing the output signals respectively from the amplification and filtering block 80 and the frequency mix and filtering block 120 in its internal memory as input and output levels of the selected transmitter, and providing the transmitter input and output levels stored in the internal memory to RF control card assembly 160; and RF control card assembly 160 for controlling the switching condition of the transmitter according to values of the input and output levels obtained at the central processing unit 150.

The amplification and filtering block 80 comprises: amplifier 81 for amplifying the output signal from the multiplexer 70 up to the predetermined level; attenuator 82 for attenuating the output signal from the amplifier 81; and band filter 83 for filtering the output signal from the attenuator 82 to provide a signal of the predetermined band.

The frequency mix and filtering block 120 comprises: amplifier 121 for amplifying the output signal from the coupler 100 up to the predetermined level; attenuator 122 for attenuating the output signal from the amplifier 121 down to a predetermined level; frequency mixer 123 for mixing an output frequency of the attenuator 122 with the oscillation frequency output from the phase locked loop block 110; and band filter 124 for filtering the output frequency from the frequency mixer 123 to provide a signal of the predetermined band.

In the apparatus for measuring input and output levels of the base station transmitter according to the present invention, primarily, the first to fourth frequency splitters 11~14 in the frequency splitting block 10 each splits one of the four CDMA modulated input transmitting IF signals, TX_IF, into three IF signals. Since input signals are four transmitting IF signals, TX_IF, total split IF signals become 4*3=12. In other words, one transmitting IF signal is split into three IF signals. One of the three IF signals is distributed to the following 4:5 switch 20 and another is distributed to the back of the DICSU and terminated at a normal state to identify the state of each stage in the base station. The remaining one IF signal is distributed to the multiplexer 70.

The frequency signals are attenuated by about 4.5 dB due to loss at the first to fourth frequency splitters 11~14, so the first to fourth frequency splitters 11~14 may perform the same function of the existing attenuator.

The 4:5 switch 20 switches four input IF signals by the FA to the first to fifth transmitters 31~35 in the following transmitter block 30. If the first to fourth transmitters 31~34 operate in normal, the switch 20 couples the four input IF signals to the corresponding first to fourth transmitters 31~34 without changing the present switching condition. On the other hand, if a certain transmitter of the first to fourth transmitters 31~34 abnormally operates, the switch 20 switches the IF signal that is expected to be input into the transmitter now operating in abnormal to the fifth transmitter 35.

The first to fifth attenuator-amplifiers 41~45 in the attenuation and amplification block 40 attenuate and amplify RF signals output from the first to fifth transmitters 31~35 in the transmitter block 30. The isolator block 50 compensates for signal distortion as in the conventional art and sends the compensated transmitting signals by the FA to the RF combiner 60.

The RF combiner 60 combines output signals of the transmitters and forwards a transmitting signal through one transmitting port as in the conventional art.

If intending to measure an input of a certain transmitter during the above operation, the central processing unit 150 generates a selection signal for the transmitter to be measured to the multiplexer 70 and, simultaneously, generates PLL local data (PLL clock, data, and enable signal) for forming a desired IF signal to the phase locked loop block 110. For example, the central processing unit 150 sets 1FA to "00", 2FA to "01", 3FA to "10", and 4FA to "11" and, if the signal of a transmitter corresponding to the selected FA is intended to be measured, provides the corresponding data to the multiplexer 70.

The multiplexer 70 then selects and outputs one of the outputs from the first to fourth frequency splitters 11~14 in the frequency splitting block 10 according to the selection signal received from the central processing unit 150.

The amplification and filtering block 80 amplifies the selected IF from the multiplexer 70 up to the predetermined level with the amplifier 81 and passes the amplified IF through the attenuator 82 for matching. The amplification and filtering block 80 narrow band-filters the IF to obtain the frequency of a desired band, namely, frequency having a center frequency of 4.95 MHz and a bandwidth of 30 kHz with the band filter 83 and applies the band filtered frequency to the first voltage amplifier 90.

The first amplifier 90 amplifies the output signal from the amplification and filtering block 80 so as to have a DC voltage value and applies the amplified signal to the central processing unit 150.

The DC voltage value depends on a value defined by the RF control assembly 160.

For example, if the output DC value is less than 0.5 V, this means that there are no input signals or the input signal is very small. If the output DC value is 4.5V or more, this means that the input signal is very large.

At this time, 1V corresponds to −15 dBm, 2V to −10 dBm, 3V to −5 dBm, and 4V to 0 dBm.

The central processing unit 150 stores the received input level value of a certain transmitter in the internal memory and applies the stored IF input level value of the certain transmitter to the RF control card assembly 160 if there is a request of the level value from the RF control card assembly 160. In the above description, the method of measuring an input level of one transmitter is reviewed. An input level of another transmitter can also be measured in such a manner that the central processing unit 150 generates a selection signal for the another transmitter to the multiplexer 70 and controls to select the input level of the another transmitter. In this way, input levels of all transmitters can be measured.

Until now, the method of measuring input levels of transmitters has been disclosed. The following description concerns a method of measuring output levels of the transmitters.

The coupler 100 couples the transmitting signal output from the RF combiner 60 to the frequency mix and filtering block 120.

The frequency mix and filtering block 120 amplifies the input frequency up to the predetermined level with the amplifier 121, attenuates the amplified frequency with the attenuator 122, and mixes the attenuated frequency from the attenuator 122 with the oscillation frequency received from the phase locked loop block 110.

The phase locked loop block 110 receives a signal for selecting a certain transmitter from the central processing unit 150, the signal including a PLL clock, data, enable signal, and generates the oscillation frequency of the same level as an output level of the corresponding transmitter based upon the received selection signal. The generated oscillation frequency falls under 754 MHz~779 MHz.

The frequency mixer 123 mixes the output signal from the attenuator 122 with the output signal from the phase locked loop block 110 to generate an IF signal of 114.99 MHz. The band filter 124 band-filters the frequency output from the frequency mixer 123 to provide a frequency signal having a center frequency of 114.99 MHz and a bandwidth of 30 kHz to the output level detector 130.

The output level detector 130 detects an output level from the frequency received from the band filter 124. The second voltage amplifier 140 amplifies a DC level from the output level detector 130 and provides the amplified DC level to the central processing unit 150 as a DC voltage value.

If the DC level output from the second voltage amplifier 150 is less than 0.5V, this means that the corresponding transmitter does not have any output signals or the output signal is very small. If the DC level is 4.5V or more, this means that the output of the corresponding transmitter is very large.

For the output DC level of the second voltage amplifier 150, 1V corresponds to −25 dBm, 2V to −20 dBm, 3V to −15 dBm, and 4V to −10 dBm.

The central processing unit 150 stores the DC level value obtained at the second voltage amplifier 140 in the internal memory as the output level value of the corresponding transmitter and applies the stored output value of the transmitter to the RF control card assembly 160 when there is a request of the value of the transmitter output level from the RF control card assembly 160.

The RF control card assembly 160 searches DC level values of the corresponding transmitter. If the transmitter is determined to have only input without output, the RF control card assembly decides abnormality of the corresponding transmitter and generates a switching control signal to the 4:5 switch 20 so as to cut off the transmitter and change the signal path.

As illustrated above, the present invention can detect input and output levels of transmitters in the base station, thereby allowing measurement of gain of the transmitters and monitoring of the transmitters' operation states.

In addition, when locking of a transmitter's PLL fails, the corresponding transmitter can be conveniently cut off and switching to another transmitter is readily performed. When the gain of the transmitter is less than a set value, control for changing the path can be immediately effected, thereby obtaining optimal transmitting power.

It will be apparent to those skilled in the art that various modifications and variations can be made in the apparatus of measuring input and output levels of base station transmitters in the mobile communication system of the present invention without deviating from the spirit or scope of the invention. Thus, it is intended that the present invention covers the modifications and variations of this invention provided they come within the scope of the appended claims and their equivalents.

What is claimed is:

1. In a base station signal distribution & combine shelf unit (DICSU) including a switch for switching intermediate frequency (IF) to be transmitted via transmitters to a plurality of transmitters, a plurality of amplifiers for amplifying a plurality of transmitter output signals, and a radio frequency (RF) combiner for receiving a plurality of amplifier output signals via a plurality of isolators and combining a plurality of RF signals to forward a combined signal through a single path, an apparatus for measuring input and output levels of the base station transmitters in a mobile communication system, said apparatus comprising:

frequency splitting means disposed prior to said switch, for splitting the IF to be transmitted via the transmitters;

frequency selection means for selecting and outputting one of a plurality of signals output from said frequency splitting means according to a transmitter selection signal output from a central processing unit that controls overall system operation;

amplification and filtering means for amplifying an output signal from said frequency selection means up to a predetermined level and filtering an amplified signal to provide a signal of a set band;

coupling means for providing a signal corresponding to the signal output from said RF combiner as a transmitter output level signal;

phase locked loop means for generating oscillation frequency of a predetermined band according to control of said central processing unit;

frequency mix and filtering means for amplifying the signal output from said coupling means up to a predetermined level, mixing the amplified signal with the signal output from said phase locked loop means, and band filtering a mixed signal to provide an output;

output level detection means for detecting a level of the signal output from said frequency mix and filtering means;

the central processing unit for applying the selection signal for a transmitter to be measured to said frequency selection means so as to select the transmitter, storing the signals respectively output from said amplification and filtering means and said frequency mix and filtering means in an internal memory as input and output levels of said selected transmitter, and providing the transmitter input and output level values stored in the internal memory to an RF control card assembly; and the RF control card assembly for controlling switch of said transmitter based upon said transmitter input and output level values received from said central processing unit.

2. The apparatus according to claim 1, wherein said frequency splitting means includes first to fourth frequency splitters, each of said frequency splitters dividing one of CDMA modulated four input transmitting intermediate frequency (IF) signals into three IF signals and distributing one of the three IF signals to the following 4:5 switch, another signal to a back of the signal distribution & combine shelf unit (DICSU) to terminate in a normal state thus allowing determination of a state of each stage in the base station, and the remaining IF signal to said frequency selection means.

3. The apparatus according to claim 1, wherein said frequency selection means consists of a multiplexer that selects one of the plurality of signals output from said frequency splitting means according to the transmitter selection signal output from said central processing unit for controlling the overall system operation.

4. The apparatus according to claim 1, wherein said amplification and filtering means comprises: an amplifier for amplifying the signal output from said frequency selection means; an attenuator for attenuating a signal output from said amplifier; and a band filter for filtering an output signal from said attenuator to provide a signal having the set band.

5. The apparatus according to claim 1, wherein said frequency mix and filtering means comprises: an amplifier for amplifying the signal output from said coupling means up to the predetermined level; an attenuator for attenuating an output signal from said amplifier down to a predetermined level; a frequency mixer for mixing output frequency from said attenuator with the oscillation frequency output from said phase locked loop means; and a band filter for filtering output frequency from said frequency mixer to obtain the signal of the set band.

6. The apparatus according to claim 1, further comprising: first voltage amplification means for operational-amplifying the output signal from said amplification and filtering means and providing an amplified signal to said central processing unit; and second voltage amplification means for operational-amplifying the output signal from said output level detection means and providing an amplified signal to said central processing unit.

* * * * *